United States Patent
Nagata et al.

(10) Patent No.: US 7,366,335 B2
(45) Date of Patent: Apr. 29, 2008

(54) METHOD, APPARATUS, AND RECORDING MEDIUM FOR PROCESSING TOMOGRAPHIC IMAGE

(75) Inventors: Takefumi Nagata, Kaisei-machi (JP); Kazuo Shimura, Kaisei-machi (JP); Takeshi Ohkubo, Kaisei-machi (JP)

(73) Assignee: FUJIFILM Corporation, Tokyo (JP)

( * ) Notice: Subject to any disclaimer, the term of this patent is extended or adjusted under 35 U.S.C. 154(b) by 434 days.

(21) Appl. No.: 09/981,253

(22) Filed: Oct. 18, 2001

(65) Prior Publication Data

US 2002/0057827 A1    May 16, 2002

(30) Foreign Application Priority Data

Oct. 18, 2000    (JP)    ............................. 2000-317322

(51) Int. Cl.
*G06K 9/00*    (2006.01)

(52) U.S. Cl. ....................................... 382/131; 382/132

(58) Field of Classification Search ................ 382/131, 382/255, 132, 128, 266, 169, 235, 274, 263, 382/264; 250/363.02, 363.04, 363.05, 583; 378/21, 4; 600/407, 425
See application file for complete search history.

(56) References Cited

U.S. PATENT DOCUMENTS

| | | | | |
|---|---|---|---|---|
| 4,315,318 A | * | 2/1982 | Kato et al. .................. | 382/264 |
| 5,046,147 A | * | 9/1991 | Funahashi et al. ........... | 250/587 |
| 5,319,719 A | * | 6/1994 | Nakazawa et al. ........... | 382/132 |
| 5,454,044 A | | 9/1995 | Nakajima .................... | 382/132 |
| 5,493,622 A | * | 2/1996 | Tsuchino et al. ............ | 382/132 |
| 5,910,972 A | * | 6/1999 | Ohkubo et al. ................ | 378/54 |
| 5,991,457 A | * | 11/1999 | Ito et al. ..................... | 382/254 |
| 6,415,049 B1 | * | 7/2002 | Yanagita et al. ............. | 382/132 |
| 6,424,730 B1 | * | 7/2002 | Wang et al. ................. | 382/128 |

FOREIGN PATENT DOCUMENTS

JP         03-276265      *   6/1991

* cited by examiner

*Primary Examiner*—Duy M Dang
(74) *Attorney, Agent, or Firm*—Sughrue Mion, PLLC

(57) ABSTRACT

A method and apparatus for carrying out tomographic image processing that enables lung areas and a mediastinum in a chest tomographic image to be reproduced in one image with appropriate contrast is provided. Image data representing a chest tomographic image are obtained by using a tomography apparatus. Normalization means in a tomographic image processing apparatus normalizes the image data and obtains normalized image data. Compression processing means carries out dynamic range compression processing on the normalized image data to compress a high density range thereof. The image data after the compression processing are subjected to frequency enhancing processing, and the image data after the frequency enhancing processing are then subjected to tone conversion processing. The processed image data obtained in the above manner are reproduced by a reproduction apparatus.

11 Claims, 4 Drawing Sheets

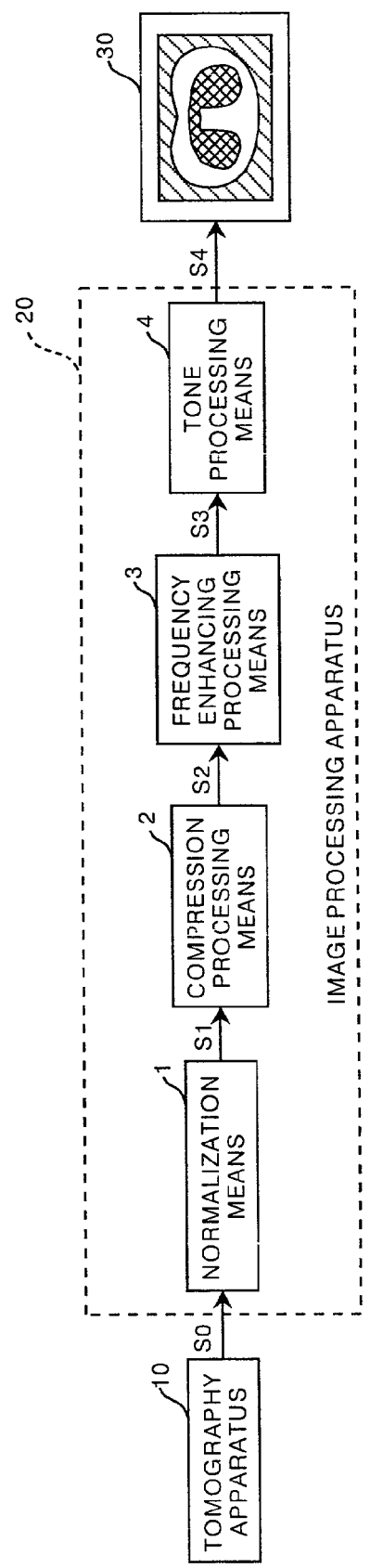

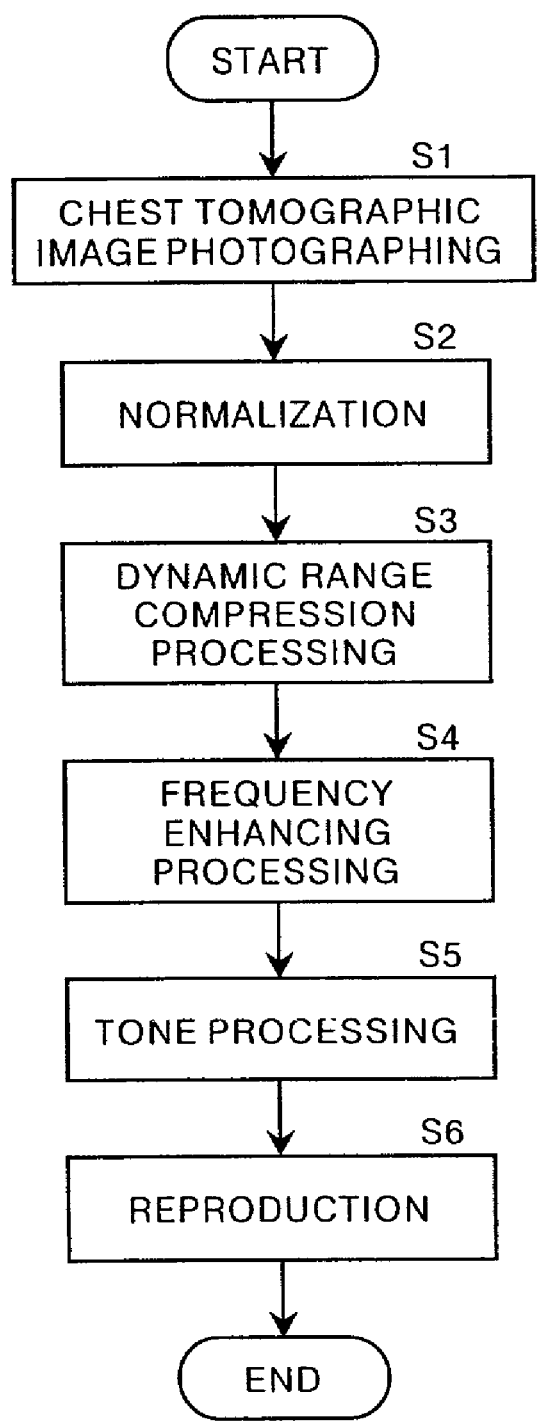

METHOD, APPARATUS, AND RECORDING MEDIUM FOR PROCESSING TOMOGRAPHIC IMAGE

BACKGROUND OF THE INVENTION

1. Field of the Invention

The present invention relates to a method and an apparatus for carrying out tomographic image processing on image data representing a tomographic image such as a chest CT image and a chest MRI image, and a computer-readable recording medium storing a program to cause a computer to execute the tomographic image processing method.

2. Description of the Related Art

In the field of medicine, various diagnostic image production apparatuses (modalities) using X-rays or the like have been in use, and apparatuses for CR (Computed Radiography), CT (Computed Tomography), MRI (Magnetic Resonance Imaging), and the like have been put into practice. Images generated by these modalities are displayed on CRT displays or output on films by laser printers. In this manner, such images are used for diagnosing areas of diseased tissue and injuries, and understanding degrees thereof in a clinical setting.

CT images and MRI images obtained by CT apparatus and MRI apparatus (hereinafter called tomographic images) have a substantially high density resolution. Therefore, when such an image is reproduced, details thereof can be visualized by setting the contrast high. Meanwhile, a tomographic image of a chest includes lung areas and a mediastinum, and lung areas are in a high density range while a mediastinum is in a low density range.

As has been described above, tomographic images are reproduced by setting the contrast high. However, in a chest tomography image, lung areas and a mediastinum, which are both necessary for diagnosis, are respectively in a high density range and in a low density range, and setting the contrast high narrows a visualization range. As a result, only either the lung areas or the mediastinum have appropriate contrast. This is because the image of either the lung areas or the mediastinum becomes flat if the other has the appropriate density. Therefore, for a chest tomographic image, two images whose tones are respectively converted in order to have lung areas and a mediastinum be in appropriate contrast are reproduced for appropriate diagnosis.

When a windowing condition indicating which range of CT values are displayed in a predetermined display range is considered for a chest CT image, a window level (a center value of the CT values) is set to −600 and a window width (a range of the CT values) is set to around 1500 for lung areas to have the appropriate density. Meanwhile, for a mediastinum, the window level is set to 50 while the window width is set to around 400.

However, regarding a chest tomographic image, it is troublesome for a doctor to carry out diagnosis using two images although the same body portion of the same patient is photographed. Therefore, reproduction of lung areas and a mediastinum in appropriate contrast in one image has been desired. In this case, dynamic range compression processing (as described in U.S. Pat. No. 5,454,044) causing a low density range of an image to have higher density can be carried out as in a conventional CR apparatus. However, in a chest tomographic image, since an edge of a mediastinum in a low density range is extremely sharp, the sharp edge is reproduced to be blurry if the density of the low density range is increased. As a result, a reproduced image becomes substantially unnatural.

SUMMARY OF THE INVENTION

The present invention has been conceived based on consideration of the above problem. An object of the present invention is therefore to provide a tomographic image processing method and a tomographic image processing apparatus for reproducing lung areas and a mediastinum of a chest tomographic image with appropriate contrast for both areas in one image, and to provide a computer-readable recording medium storing a program to cause a computer to execute the tomographic image processing method.

A tomographic image processing method of the present invention is a method for carrying out image processing on image data representing a chest tomographic image, and the method comprises the step of carrying out dynamic range compression processing on the image data so as to compress a high density range of the chest tomographic image.

In the tomographic image processing method of the present invention, it is preferable for frequency enhancing processing (as described in U.S. Pat. Nos. 4,315,318 and 5,991,457) to be carried out on the image data having been subjected to the dynamic range compression processing.

A tomographic image processing apparatus of the present invention is an apparatus for carrying out image processing on image data representing a chest tomographic image, and the apparatus comprises dynamic range compression processing means for carrying out dynamic range compression processing on the image data in order to compress a high density range of the chest tomographic image.

It is preferable for the tomographic image processing apparatus of the present invention to further comprise frequency enhancing processing means for carrying out frequency enhancing processing on the image data that have been subjected to the dynamic range compression processing.

The tomographic image processing method of the present invention may be provided as a program stored on a computer-readable recording medium that causes a computer to execute the tomographic image processing method.

According to the present invention, the dynamic range compression processing is carried out on the chest tomographic image data in order to compress the high density range, that is, in order to decrease density of the high density range. Therefore, both lung areas and a mediastinum included in the chest tomographic image keep the contrast high without being flattened. Furthermore, since the dynamic range compression processing decreases the density of the high density range, an edge in a low density range does not become blurry. Therefore, a radiation image giving a natural impression can be obtained. Consequently, both the lung areas and the mediastinum can be reproduced in one image in a satisfactory manner, and a diagnosis can be carried out efficiently.

Moreover, by carrying out the frequency enhancing processing together with the dynamic range compression processing, the chest tomographic image has a higher quality.

BRIEF DESCRIPTION OF THE DRAWINGS

FIG. 1 is a block diagram showing a configuration of an image reproducing system having a tomographic image processing apparatus as an embodiment of the present invention;

FIG. 4 is a flow chart showing operation of this embodiment.

DESCRIPTION OF THE PREFERRED EMBODIMENT

Figure 2A:
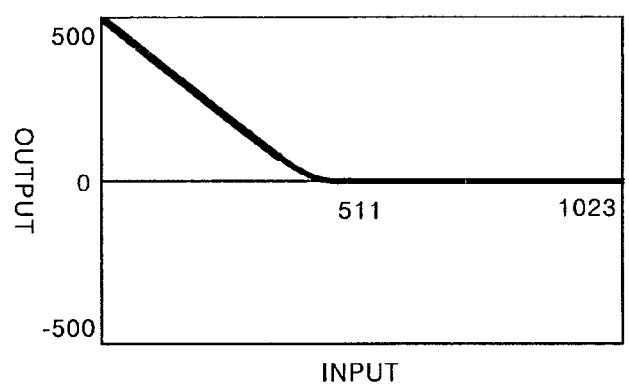
FIGS. 2A to 2C show examples of a dynamic range compression coefficient.

Hereinafter, an embodiment of the present invention will be explained with reference to the accompanying drawings.

FIG. 1 is a block diagram showing a configuration of an image reproducing system having a tomographic image processing apparatus as an embodiment of the present invention. As shown in FIG. 1, the image reproducing system comprises a tomography apparatus 10 such as a CT apparatus or an MRI apparatus, a tomographic image processing apparatus 20 for obtaining processed image data S4 by carrying out image processing on image data S0 representing a chest tomographic image obtained by photographing a chest of a human body by using the tomography apparatus 10, and a reproduction apparatus 30 such as a monitor and a printer for reproducing the processed image data S4. In this embodiment, the image data S0 represent luminance data. Therefore, the larger the data are, the lower the density becomes (the whiter the image becomes).

The tomographic image processing apparatus 20 comprises normalization means 1 for obtaining normalized image data S1 by normalizing the image data S0, compression processing means 2 for obtaining image data S2 by carrying out dynamic range compression processing on the image data S1, frequency enhancing processing means 3 for obtaining image data S3 by carrying out frequency enhancing processing on the image data S2, and tone processing means 4 for obtaining the processed image data S4 by carrying out tone processing on the image data S3.

The normalization processing means 1 normalizes the image data S0, for example, in a range of −1200 to 400 into the 10-bit image data S1 having a range of 0 to 1023.

Figure 2B:
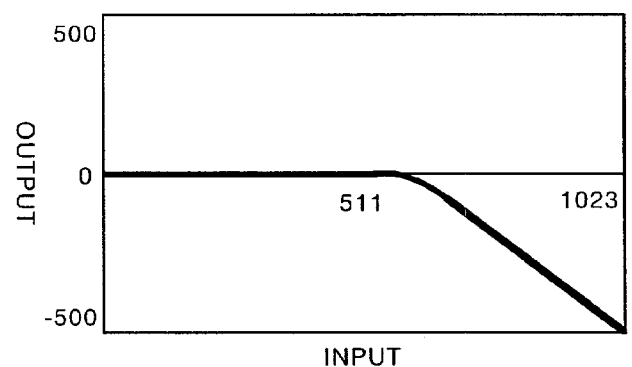
Figure 2C:
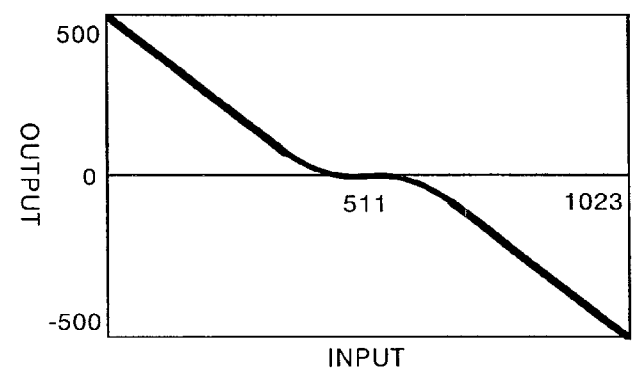

The compression processing means 2 carries out the dynamic range compression processing on the image data S1 by using Equation (1) below, as has been described in U.S. Pat. No. 5,454,044, for example:

$$S2 = S1 + D(S1us) \quad (1)$$

where S1us refers to the blurred image data of the image data S1 and D refers to a dynamic range compression function. The blurred image data S1us are found by averaging signal values of N×N pixels around each pixel in the image data S1. An example of the dynamic range compression function D is shown in FIGS. 2A to 2C. As shown in FIGS. 2A to 2C, the dynamic range function D is a function causing a value of output image data to become smaller if a value of input image data is smaller. Therefore, by the dynamic range compression processing, a high density range of the blurred image data S1us is compressed.

The frequency enhancing processing means 3 carries out the frequency enhancing processing on the image data S2 according to Equation (2) below:

$$S3 = S2 + \beta \times (S2 - S2us) \quad (2)$$

where S2us are the blurred image data of the image data S2 and β is an enhancement coefficient.

Figure 3:
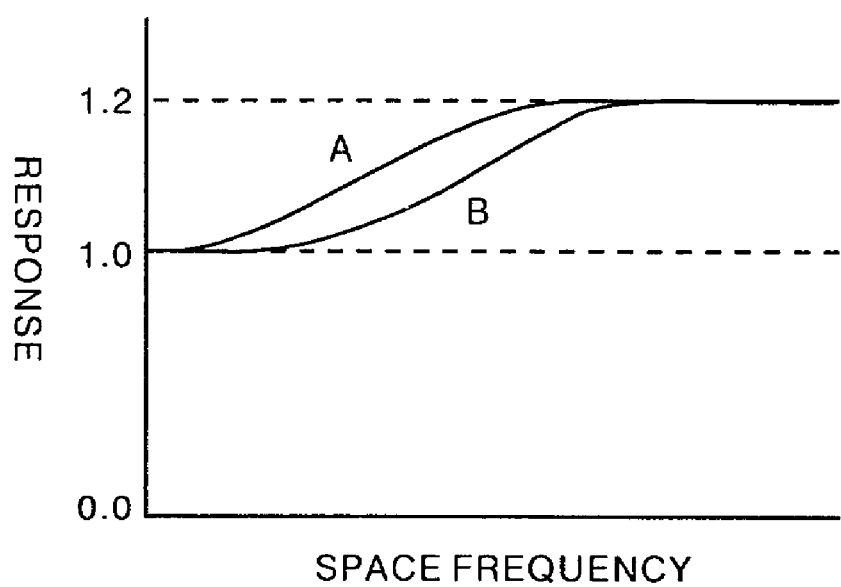
FIG. 3 is a diagram showing a characteristic of frequency enhancing processing.

The frequency enhancing processing has a characteristic causing a response of a higher frequency component to become larger, as shown in FIG. 3. Either of the characteristics shown by A or B in FIG. 3 can be used.

The frequency enhancing processing means 3 may carry out so-called multiple frequency enhancing processing as described in U.S. Pat. No. 5,991,457. In the multiple frequency enhancing processing, a plurality of blurred image data sets having different sharpness, that is, having different frequency response characteristics are generated from original image data. By obtaining the difference between two signal values in each of the unsharp image data sets and the original image data, band-limited image data sets representing frequency components in a limited frequency band in the original image data are then generated. The band-limited image data sets are respectively converted by using different conversion functions in order to have a desired magnitude, and the band-limited image data sets are added. In this manner, the multiple frequency enhancing processing is carried out. This processing applied to this embodiment is expressed by Equation (3) below:

$$S3 = S2 + \beta(S2) \times Fusm(S2, S2us1, S2us2, \ldots, S2usn) \quad (3)$$

$$Fusm(S2, S2us1, S2us2, \ldots, S2usn) =$$
$$f_1(S2 - S2us1) + f_2(S2us1 - S2us2) + \ldots +$$
$$f_k(S2usk-1 - S2usk) + \ldots + f_n(S2usn-1 - S2usn)$$

where S2usk (k=1~n) refers to each of blurred image data sets of the image data S2, $f_k$(k=1~n) refers to the conversion function for converting each of the band-limited image data sets, and β (S2) refers to an enhancement coefficient that is determined based on the image data S2.

In the tone processing means 4, the tone conversion processing is carried out on the image data S3 as shown by Equation (4) below:

$$S4 = \gamma(S3) \quad (4)$$

Where γ is a tone conversion function.

In this embodiment, it is preferable for a degree of the dynamic range compression processing carried out by the compression processing means 2 to be changed in accordance with a degree of the tone conversion processing carried out by the tone processing means 4. In other words, the larger the contrast of the processed image data S4 obtained by the tone conversion processing becomes, the flatter the image becomes in the low density range and in the high density range. Therefore, it is preferable for the degree of the dynamic range compression coefficient D in Equation (1) to be changed in order not to cause the image to become flat.

Operation of this embodiment will be explained next. FIG. 4 is a flowchart showing the operation of this embodiment. First, photographing of a chest of a human body is carried out by using the tomography apparatus 10, and the image data S0 representing the chest tomographic image are obtained (Step S1). The normalization means 1 in the tomographic image processing apparatus 20 carries out the normalization on the image data S0 to generate the 10-bit normalized image data S1 (step S2). The compression processing means 2 carries out the dynamic range compression processing on the image data S1 and the image data S2 are obtained (Step S3).

The frequency enhancing processing means 3 carries out the frequency enhancing processing on the image data S2 to obtain the image data S3 (Step S4). The image data S3 are subjected to the tone processing by the tone processing means 4, and the processed image data S4 are obtained (Step S5). The processed image data S4 are reproduced by the reproduction apparatus 30 (Step S6) to end the procedure.

As has been described above, in this embodiment, the dynamic range compression processing is carried out on the image data S0 representing the tomographic image in order to compress the high density range, that is, in order to decrease density of the high density range. Therefore, both lung areas and a mediastinum in the image can keep the contrast high without being flattened. Furthermore, since the dynamic range compression processing is carried out to decrease the density of the high density range, an edge in the low density range is prevented from becoming blurry. In this manner, a radiation image giving a natural impression can be obtained. As a result, the lung areas and the mediastinum can be reproduced preferably in one image, which leads to an efficient diagnosis.

Moreover, since both dynamic range compression processing and frequency enhancing processing are carried out, the chest tomographic image can be of high quality.

In the above embodiment, the image data S0 are normalized. However, normalization is not necessarily carried out, and the dynamic range compression processing may be carried out directly on the image data S0 without normalization.

The dynamic range compression processing carried out in the present invention is not limited to the processing described by Equation (1). Any processing causing the contrast (the dynamic range of the signal values) of a low frequency component in the image to become narrow can be used.

What is claimed is:

1. A tomographic image processing method for carrying out image processing on image data representing a chest tomographic image, the method comprising the steps of:
   carrying out dynamic range compression processing on the image data so as to compress a high density range of the chest tomographic image,
   wherein the chest tomographic image includes a low density range that is unaffected by the compression of the high density range; and
   carrying out tone conversion processing on the image data which has been processed by frequency enhancing processing.

2. A tomographic image processing method as defined in claim 1, the method further comprising the step of:
   carrying out frequency enhancing processing on the image data having been subjected to the dynamic range compression processing.

3. The tomographic image processing method as defined in claim 2, wherein the frequency enhancing processing is multiple frequency enhancing processing.

4. The tomographic image processing method as defined in claim 1, wherein only the high density range is compressed.

5. The tomographic image processing method as defined in claim 1, wherein a degree of the dynamic range compression processing is changed in accordance with a degree of the tone conversion processing.

6. A tomographic image processing apparatus for carrying out image processing on image data representing a chest tomographic image, the apparatus comprising:
   dynamic range compression processing means for carrying out dynamic range compression processing on the image data in order to compress a high density range of the chest tomographic image,
   wherein the chest tomographic image includes a low density range that is unaffected by the compression of the high density range;
   and means for carrying out tone conversion Processing on the image data which has been processed by frequency enhancing processing.

7. A tomographic image processing apparatus as defined in claim 6, further comprising:
   frequency enhancing processing means for carrying out frequency enhancing processing on the image data that have been subjected to the dynamic range compression processing.

8. The tomographic image processing apparatus as defined in claim 7, wherein the frequency enhancing processing is multiple frequency enhancing processing.

9. A computer-readable recording medium storing a program to cause a computer to execute a tomographic image processing method for carrying out image processing on image data representing a chest tomographic image, the program comprising the procedure of:
   carrying out dynamic range compression processing on the image data so as to compress a high density range of the chest tomographic image,
   wherein the chest tomographic image includes a low density range that is unaffected by the compression of the high density range, and
   carrying out tone conversion Processing on the image data which has been processed by frequency enhancing processing.

10. A computer-readable recording medium as defined in claim 9, the program further comprising the procedure of:
    carrying out frequency enhancing processing on the image data having been subjected to the dynamic range compression processing.

11. The computer-readable recording medium as defined in claim 10, wherein the frequency enhancing processing is multiple frequency enhancing processing.

* * * * *